(12) United States Patent
Fukushima et al.

(10) Patent No.: US 6,287,475 B1
(45) Date of Patent: Sep. 11, 2001

(54) MAGNETIC HEAD SLIDER MANUFACTURING METHOD

(75) Inventors: Nobuto Fukushima; Keisuke Kigawa, both of Saitama (JP)

(73) Assignee: Citizen Watch Co., Ltd., Tokyo (JP)

( * ) Notice: Subject to any disclaimer, the term of this patent is extended or adjusted under 35 U.S.C. 154(b) by 0 days.

(21) Appl. No.: 09/043,512

(22) PCT Filed: Oct. 15, 1997

(86) PCT No.: PCT/JP97/03703

§ 371 Date: May 26, 1998

§ 102(e) Date: May 26, 1998

(87) PCT Pub. No.: WO98/16931

PCT Pub. Date: Apr. 23, 1998

(30) Foreign Application Priority Data

Oct. 15, 1996 (JP) .................................... 8-272102
Apr. 22, 1997 (JP) .................................... 9-104765

(51) Int. Cl.⁷ ...................................... B44C 1/22
(52) U.S. Cl. .................. 216/22; 360/103; 29/603.16
(58) Field of Search ............... 216/22; 360/103; 29/603.16

(56) References Cited

U.S. PATENT DOCUMENTS

| | | | | |
|---|---|---|---|---|
| 4,217,168 | * | 8/1980 | Ridgway et al. | 430/320 |
| 4,564,585 | * | 1/1986 | Blaske et al. | 430/313 |
| 5,329,689 | * | 7/1994 | Azuma et al. | 29/603 |
| 5,856,064 | * | 1/1999 | Chou | 430/253 |

FOREIGN PATENT DOCUMENTS

| | | |
|---|---|---|
| 194693 | 4/1989 | (JP) . |
| 2126146 | 10/1990 | (JP) . |
| 773425 | 3/1995 | (JP) . |
| 07073425 | * 3/1995 | (JP) . |

\* cited by examiner

*Primary Examiner*—Randy Gulakowski
*Assistant Examiner*—Shamim Ahmed (57) ABSTRACT

When forming a floating-type magnetic head slider for a hard disk drive or the like using dry etching, a method for manufacturing the magnetic head slider provides a method for adhering the slider being processed to an appropriate processing fixture, and when a plurality of magnetic head sliders are being processed at one time, a row (bar) array of sliders that is prepared beforehand is adhered to a metal or ceramic base, after which a dry etching method is used to form the air bearing, dry film photo-resist being used for the adhering of the row and the base. Ion milling or reactive ion etching (RIE) can be used as the dry etching method.

16 Claims, 6 Drawing Sheets

MAGNETIC HEAD SLIDER MANUFACTURING METHOD

This application is the national phase under 35 U.S.C. §371 of prior PCT International Application No., PCT/JP97/03703, which has an International filing date of Oct. 15, 1997, which designated the United States of America, the entire contents of which are hereby incorporated by reference.

BACKGROUND OF THE INVENTION

1. Field of the Invention

The present invention relates to a magnetic head which is used in a magnetic disk apparatus, a magnetic tape apparatus or the like, and more particularly to a thin-film magnetic head having a small flying height, which is suitable for high-density recording, and to a manufacturing method therefor.

2. Background Art

Accompanying an increase in recording density, to minimize what is known as spacing loss in a floating-type head used in a magnetic disk apparatus, the spacing between the disk and the magnetic head, that is, the flying height is constantly being reduced, and there is a desire to make this constant from the outer periphery of the disk to the inner periphery of the disk.

A magnetic head slider capable of meeting such a need has been proposed and put into practical use, this being a slider having a distinct shape that is designed based on aerodynamics.

A feature of this distinctly shaped slider is that is has a depression part known as a cavity, so that a pressure lower than the atmospheric pressure is generated, this also being known as a negative-pressure slider.

This type of cavity is difficult to manufacture using mechanical cutting and grinding as used in the past, and is generally manufactured using photolithography and dry etching processes.

The method of forming a distinctly shaped slider in the past will now be described, with reference being made to FIG. 2.

Figure 2:
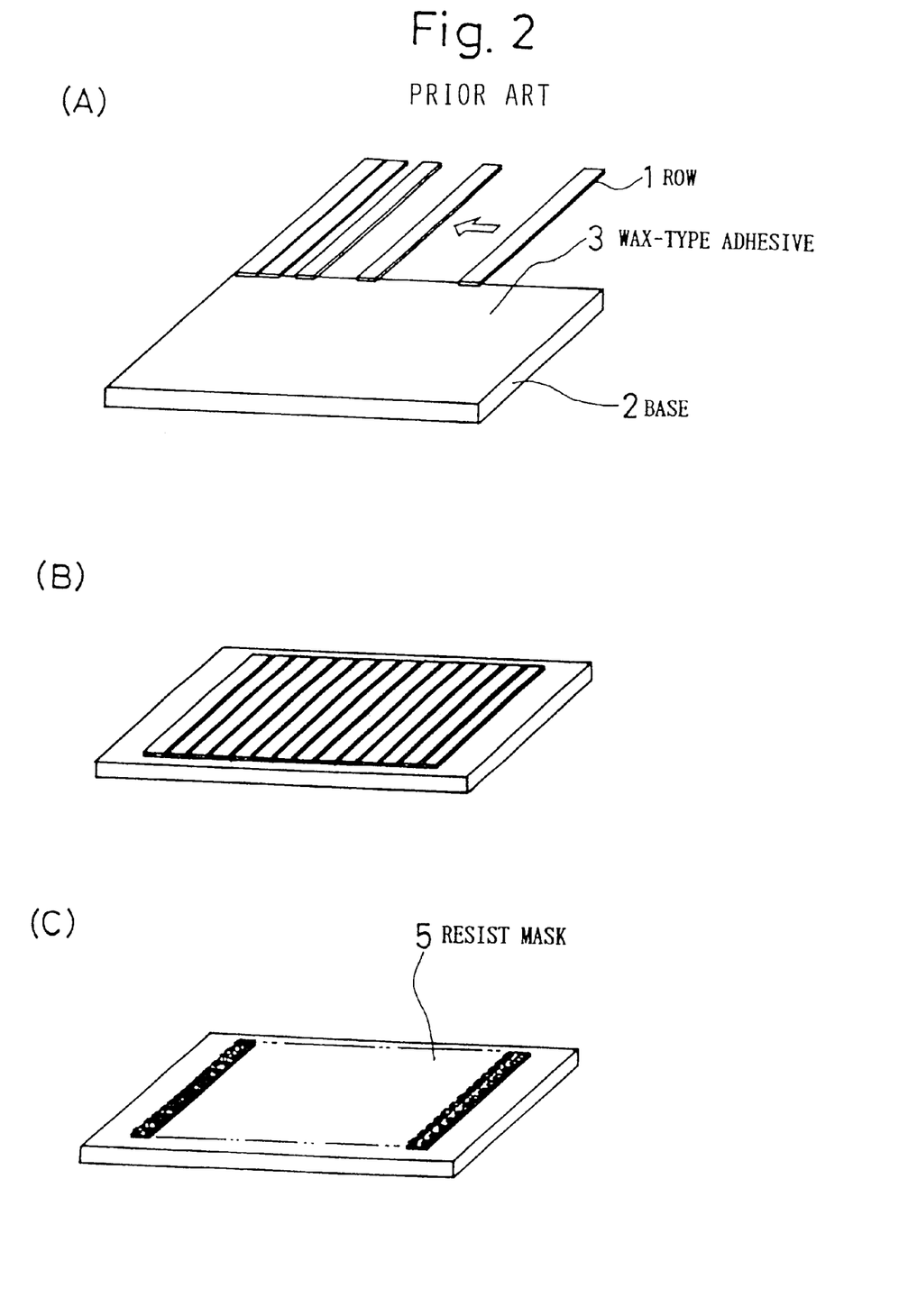
FIG. 2 is a simplified drawing which shows an example of a magnetic head slider of the past.

First, the magnetic head is processed to a bar shape which is illustrated as a row 1, as shown in FIG. 2(A).

The row 1 is then cut away from the thin-film head wafer and the air bearing surface, and processed to an appropriate pole depth.

Because processing each one of these one at a time would result in poor productivity, generally, ten to twenty or more are arranged in a row and adhered to a supporting sheet known as the base 2 for machining. The base 2, in addition to the sheet-like shape shown here, can be block-shaped, and can be made of aluminum, stainless steel, or ceramic or the like.

In consideration of a subsequent cutting operation, the block shape in particular is often used. A wax-based adhesive 3 is used to temporarily hold the row 1 to the base 2.

This adhesive is applied by rubbing a solid wax onto the base 2, which has already been heated to above the softening point of the adhesive, or by spin coating a wax which has been dissolved into an appropriate solvent. The row 1 is then pressed onto the wax-based adhesive 3, and the adhesive is gradually cooled to achieve adhesion. The adhered condition is shown in FIG. 2(B).

Next, an appropriate resist material is coated onto the row 1, and is subsequently exposed and developed, thereby obtaining a resist mask 5 that reflects the cavity pattern as shown in FIG. 2(C). Then, using a dry etching process such as ion milling, the part of the row 1 other than the masked parts is etched, so as to obtain the desired cavity shape.

Finally, by cutting away each individual head, magnetic heads having a distinctly shaped slider are completed. To peel the completed slider from the base, either heating is done again to above the softening point, or immersion is done into an organic solvent.

However, when the row is temporarily held as described above by using wax, because of the heat generated in the etching process, the wax often softens, resulting the air bearing surface being processed being stained by the wax-based adhesive 3, this hindering the achievement of the desired cavity shape, and in severe cases resulting in a peeling off and falling off of the row 1.

Additionally, because of the gas resulting from the vaporization of the wax, the etching speed is reduced, this representing a cause of variations.

Considering the thermal effect on the thin-film head when the thin-film head is attached to the base, it is not possible to simply raise the softening point of the wax, and it is generally necessary to limit the withstanding temperature of the thin-film head to 100 to 120° C. or lower. Therefore, it is necessary to select the softening point of the wax in the region of 100° C.

In order to achieve a practical etching speed in the dry etching process the substrate temperature is generally raised to nearly 100° C., so that the above-noted "looseness" problem with the wax is an unavoidable one.

While it is possible to lower the output of the etching system to hold the substrate temperature in the region of 80° C. so as to increase the yield, the resulting reduction in etching speed inevitably reduces productivity.

The present invention solves the above-noted problem, and provides a method capable of stable manufacturing of a high-precision slider with a distinct shape, the result being a contribution to the achievement of a high-recording-density magnetic disk drive.

SUMMARY OF THE INVENTION

To achieve the above-noted object, the present invention has a basic technical constitution that is described below.

Specifically, the present invention is a method of manufacturing a magnetic head slider in which the surface of the magnetic head slider that is opposed to the medium is processed by means of a dry etching method so as to obtain a prescribed air bearing shape, the slider under processing being adhered to a prescribed base with an intervening dry film photo-resist therebetween, after which etching is performed.

More specifically, the present invention is a method of manufacturing a magnetic head slider in which the surface of the magnetic head that is opposed to the medium is processing by means of a dry etching method so as to obtain a prescribed air bearing shape, this method having a step of adhering dry film photo-resist to the base that is capable of holding at least one slider or material that is to become a plurality of sliders, a step of adhering to this dry film photo-resist a slider or material that is to become a plurality of sliders, a step of forming a prescribed mask on the slider or material that is to become a plurality of sliders, and a step of etching a part that is not protected by the above-noted mask by using a dry etching method to obtain an air bearing shape.

Thus, in the present invention, in the adhering of an elongated base material (hereinafter call a row) which includes at least one slider or a part that is to become a plurality of sliders and a base, in place of wax, which was generally used in the past, a dry film photo-resist inherently to be used as a patterning mask is used as an adhesive.

The dry film photo-resist itself has stickiness, and has protective sheets on both of its sides as it is supplied from the manufacturer thereof. Therefore, if the protective sheet is peeled from one side and lamination is done as heating is applied to approximately 100° C., it is possible to adhere it to an arbitrary substrate.

While exposure is usually done after this, in the present invention because this is to be used as an adhesive layer, exposure is not done, the protective film that remains on the top surface of the dry film photo-resist being peeled off, and the rows being aligned thereon and adhered thereto.

The rows which have been adhered in this manner to the base is not only in extremely strong and intimate contact therewith, but also serves the purpose of an adhesive layer without creating problems, either in the photolithography processing comprising application of resist, exposure, and development, or in the dry etching process, thereby also allowing a rise in temperature to very close to the withstanding temperature of the thin-film head, thereby enabling high-speed etching by using a high output, and providing an improvement in yield.

After the etching process is completed, by immersion in acetone or NMP, it is possible to quickly peel the row from the base.

Thus, the present invention is a magnetic head slider manufacturing method which uses a dry film resist such as a double-side tape, used to adhere a row to a base easily, after which a cavity for a distinctly shaped slider is etched, in which not only is sufficient strength maintained during etching, but also acetone or the like can be used for easy peeling, this method uses characteristics of the dry film photo-resist that are different from those of dry film resist type photoresist.

PREFERRED EMBODIMENTS OF THE PRESENT INVENTION

Specific examples of a manufacturing method for a magnetic head slider according to the present invention are described below in detail, with reference being made to the accompanying drawings.

Figure 1:
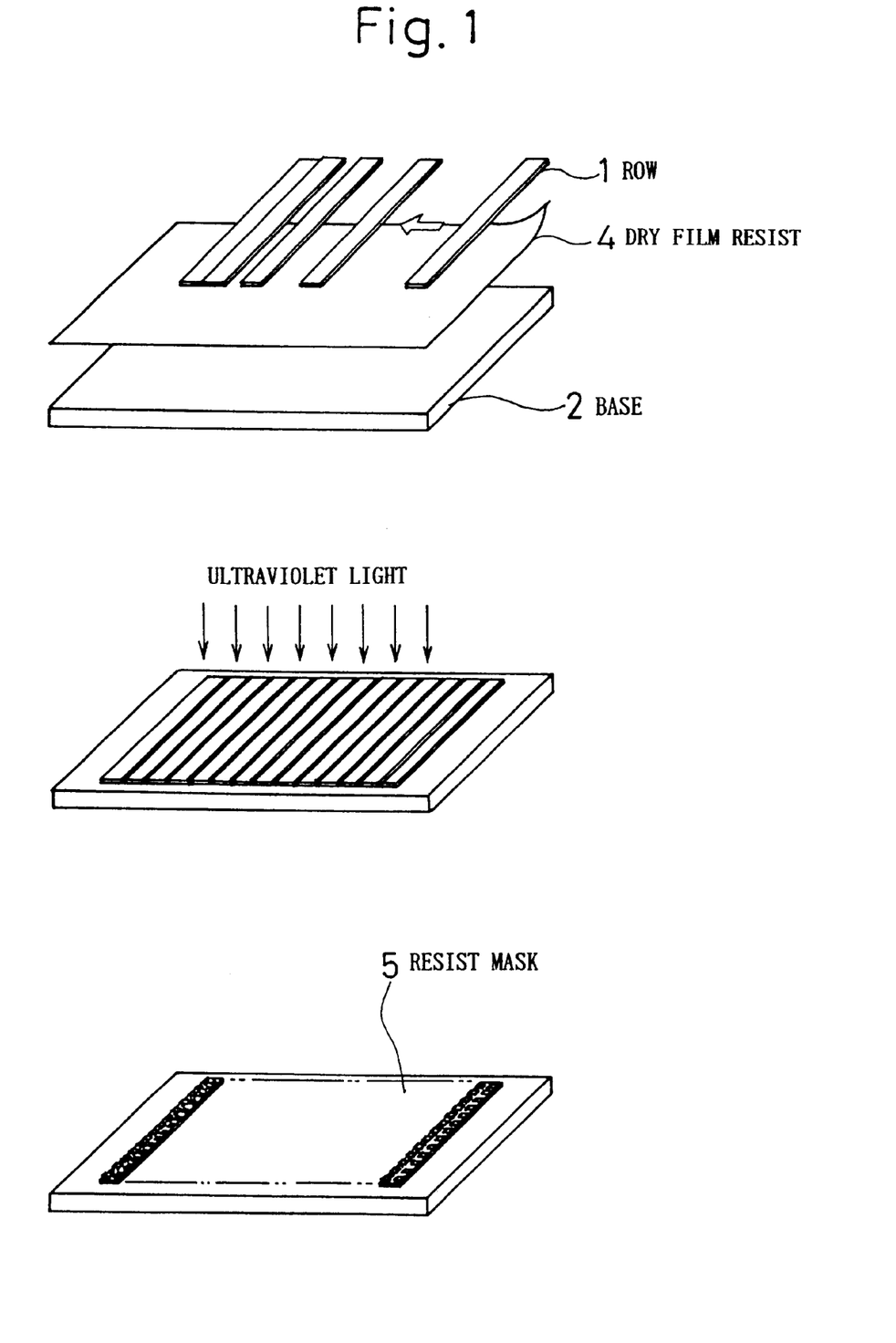
FIG. 1 is a simplified drawing which shows an example of a manufacturing process for a magnetic head slider according to the present invention.

Specifically, FIG. 1(A) through FIG. 1(C) show a manufacturing processes in an example of the manufacturing method for a magnetic head slider according to the present invention.

This drawing shows a method of manufacturing a magnetic head slider in which the surface of the magnetic head slider that is opposed to the medium is processed by means of a dry etching method so as to obtain a prescribed air bearing shape, wherein the slider under processing or a material (for example a part called a row) which includes a slider or a plurality of sliders-formation part to be described later, is adhered to a base 2 with an intervening dry film photo-resist 4, after which etching is performed.

Specifically, this is a magnetic head slider manufacturing method in which the surface of the magnetic head slider that is opposed to the medium is processed by a dry etching method to obtain a prescribed air bearing shape, this method having a step of applying a dry film photo-resist 4 on at least portions of a base 2 on which at least a slider or materials 1 that is to become a slider or a plurality of sliders, a step of adhering at least one slider or materials that is to become a slider or a plurality of sliders, to the base 2 with an intervening dry film photo-resist 4, a step of forming a prescribed mask 5 on the slider or materials that is to become a slider or a plurality of sliders, and a step of etching the part that is not protected by the above-noted mask 5, using a dry etching method, for example, so as to obtain an air bearing shape.

By way of a more detailed description of the above-noted magnetic head slider manufacturing method according to the present invention, the dry film photo-resist 4 is first adhered to the base 2, as shown in FIG. 1(A).

Although in this case the dry film photo-resist film 4 used was FRA305-38 (of a thickness 38 $\mu$m) made by Dupont MRC, a different dry film photo-resist could be used in the same manner, as long as it is a negative type.

Additionally, the thickness of the dry film photo-resist is not limited to the 38 $\mu$m thickness cited herein. Adhesion was done using a laminator, using a roller that was heated to 100° C. as the reverse-side protective film is peeled off.

After cooling, the protective film on the top surface of the dry film photo-resist is peeled off, the rows 1 being placed in position while heating the overall base 2 to 80° C., pressure also being applied to obtain intimate contact.

When doing this, it is possible after several rows 1 are placed with the base 2 in the cooled condition, to heat the base 2 to obtain an intimate contact, and variations are possible by using a designed fixture.

Next, as shown in FIG. 1(B), the overall base 2 to which rows 1 are adhered is subjected to ultraviolet light, thereby causing curing of the parts of the dry film photo-resist 4 to which a row 1 is not adhered.

Because the cured dry film photo-resist has increased strength compared to before being cured, there is an improvement in effectiveness of protecting the base during the subsequent ion milling process.

Because the curing destroys the stickiness of the exposed parts of the dry film photo-resist 4, handling is facilitated.

Next, a laminator is again used to adhere the dry film photo-resist, followed by exposure through a reticule mask projected in the prescribed air bearing shape, and then developing, thereby forming the resist mask 5.

This condition is shown in FIG. 1(C). The dry film photo-resist 5 used here becomes the mask material for forming a cavity in the air bearing surface (ABS), and this can be the same as the dry film photo-resist 4 used in the adhering of the rows 1 to the base 2. In fact, it is appropriate to select the dry film photo-resist for the resist mask 5 in view of the demand for accuracy, and to use this also for adhesion.

Next, the structure is placed in an ion milling machine and, after etching with an argon ion beam, the resist mask 5 is removed using acetone, thereby revealing a cavity in the rows 1.

At this process in the present invention, it is possible to increase the accelerating potential from the formerly used 600 V to 800 V, thereby improving the etching speed, which had been 25 nm/minute in the past, to 35 nm/minute.

This is because, as discussed earlier, the characteristics of the wax used for adhesion in the past required a suppression of heating, whereas the present invention allows the temperature to be increased to 120° C. with no deformation or peeling of the dry film photo-resist 4 and without causing any problems in manufacturing.

Finally, by cutting the rows into individual heads, the magnetic head sliders are completed. The completed sliders are immersed in either acetone or NMP to enable easy peeling.

Another method of manufacturing a magnetic head slider according to the present invention will now be described.

This method is similar to the above-described method, except that reactive ion etching is used instead of the ion milling method.

In this method, a gas mixture of boron tri-chloride gas, chlorine gas, and argon gas (with a flow ratio of 1.2:0.8:8) was used as the reactive gas, an inductively coupled plasma etching machine being used to perform etching.

Similar to the case of the first embodiment, it is possible to increase the radio-frequency output to 1.5 times of what it was with the previous method of using wax as an adhesive, this enabling not only a 20%-improvement in etching speed, but a low failure rate as well.

Next, the constitution of the third embodiment of the present invention will be described.

Figure 6:
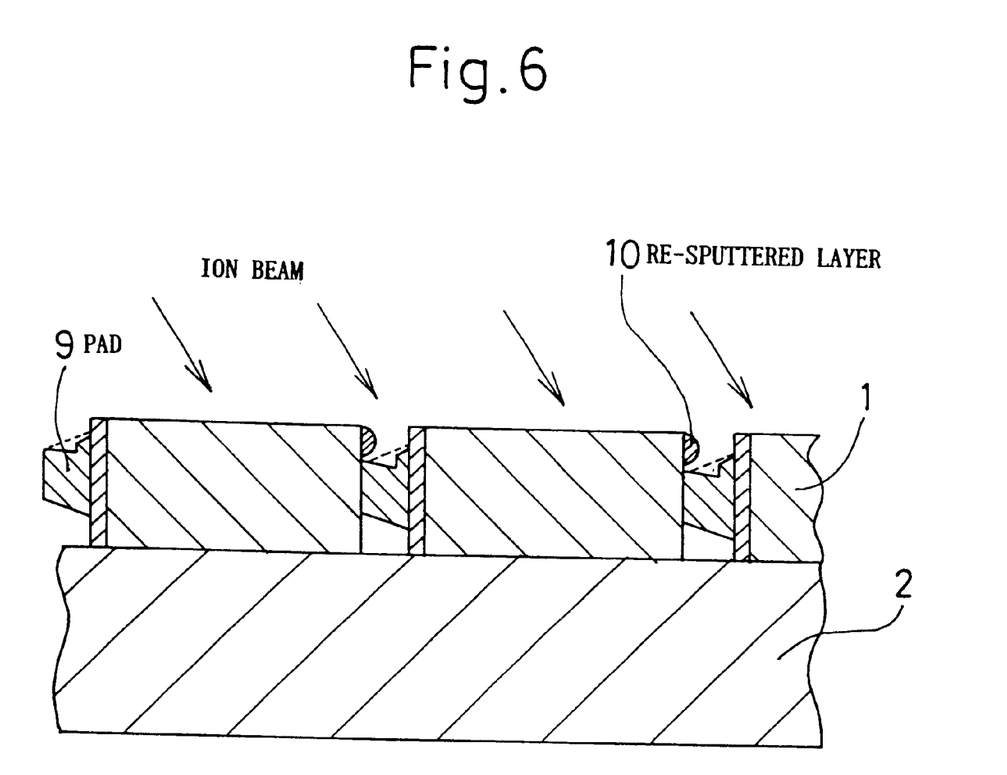
FIG. 6 is a simplified drawing which illustrates the damage to the element surface occurring in the method of the past.

Specifically, although this was not specifically mentioned with regard to two above-noted embodiments, as shown in FIG. 6, this has a pad 9 for the purpose of connection to the magnetic head element built into the side surface of the air bearing of the row bar, so that rows are not brought into intimate contact with and adhered to one another.

For this reason, plasma that flows in from the space between rows can destroy the pad 9, and the accumulation of materials sputtered from an opposing row, this being the sputter layer 10, was viewed as a problem.

This is illustrated in FIG. 6. There was a need also to solve the problem of these phenomena, which caused a loss of connectivity of the pad and problems with quality of appearance.

Because of this situation, in this embodiment in performing the same types of operations as described with regard to the foregoing embodiments, a base 2 was used that has a groove 12 that is slightly wider than the width of a row, so that dry film photo-resist 4 that enters the side surfaces of the groove 12 serves to protect a row 1 that is dropped into the groove 12.

In this manner, a row adhered to the base 2 is held in extremely strong and intimate contact, so that this serves as an adhesive layer with absolutely no problems arise later, not only in the subsequent photolithography process of resist application, exposure, and developing, but also in the dry etching process.

Additionally, because it is possible to have a temperature rise to very close to the withstanding temperature of the thin-film head, high-speed etching with high output is possible, and yield is also improved.

Because the row side surface is also protected by the dry film photo-resist, it is possible to prevent the damaging of the connection pads on the surface of the element by plasma, and it is also possible to prevent the accumulation of sputtered material from an opposing row onto the surface of the element.

Then, after the etching process has been completed, immersion in either acetone or NMP can be done to quickly peel rows off the base.

According to this embodiment, when etching a cavity for a distinctly shaped slider, the slider, more generally the row, and the base are adhered using a dry film photo-resist and by providing a groove in the base, the element surface of the row is prevented from damage by etching.

By doing this, not only is the magnetic head element protected from damage, but it is also possible to perform stable processing of a distinctly shaped slider.

By way of a more detailed explanation of this embodiment, an example of a manufacturing method for a magnetic head slider according to this embodiment will be described, with reference being made to FIG. 3.

Figure 3:
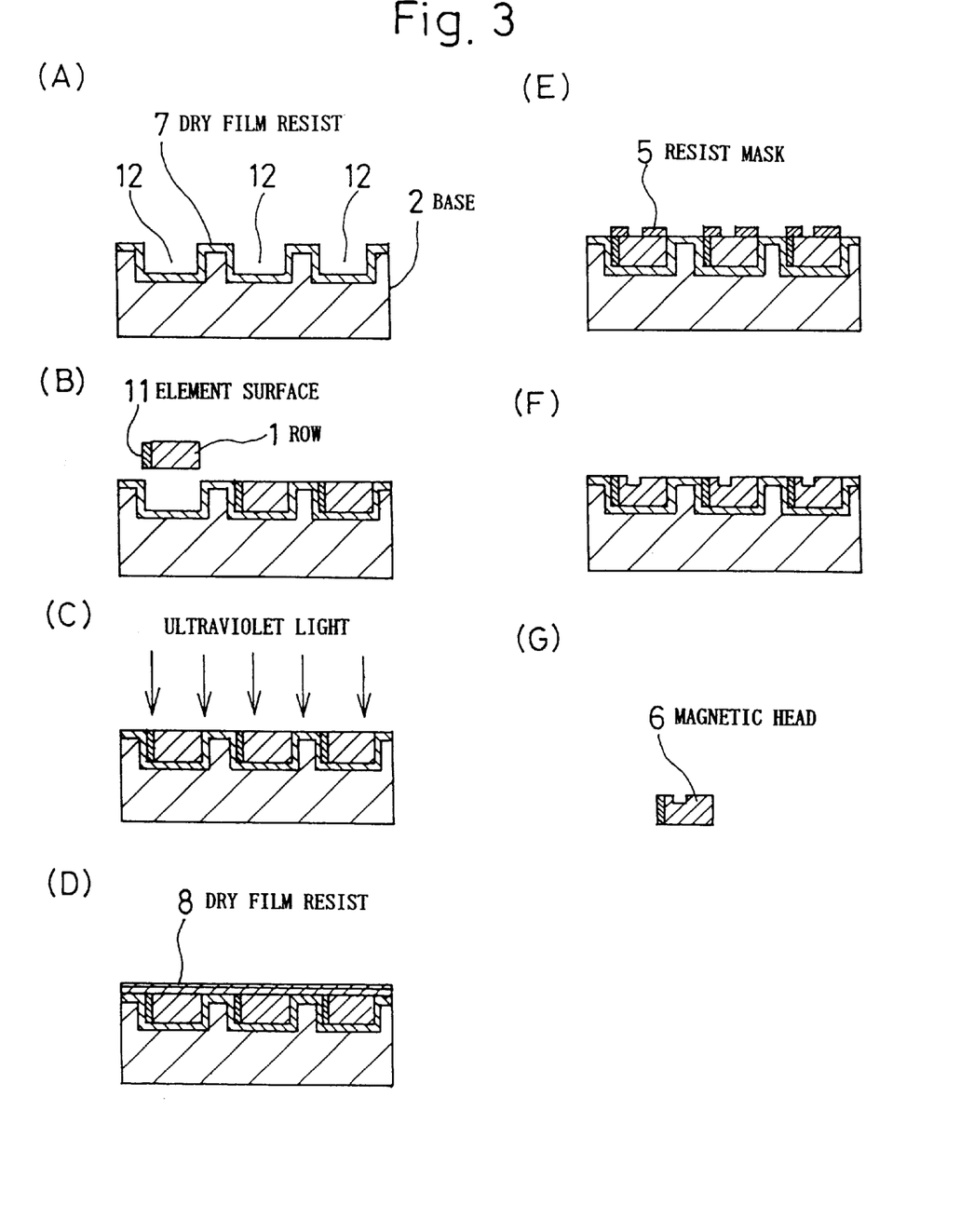
FIG. 3 is a simplified drawing which shows another example of a manufacturing process for a magnetic head slider according to the present invention.

First, as shown in FIG. 3(A), dry film photo-resist 7 is adhered to the base 2. This base is provided with a groove 12 that has a width that is wider than the width of the row 1 by two times the thickness of the dry film 7.

Although in this case the dry film photo-resist film 7 used was FRA305-38 (of a thickness 38 $\mu$m) made by Dupont MRC, a different dry film photo-resist could be used in the same manner, as long as it is a negative type.

Additionally, the thickness of the dry film photo-resist is not limited to the 38 $\mu$m thickness cited herein.

Adhesion was done using a laminator, using a roller that was heated to 100° C. as the reverse-side protective film is peeled off.

As shown in FIG. 3(B), the rows 1 are placed in position while the overall base 2 is heated to 80° C., pressure also being applied to obtain intimate contact, and the rows 1 being dropped into the grooves provided in the base.

When doing this, the element surface 11 at the row side surface is covered by part of the dry film photo-resist 7 that comes around into the groove provided in the base 2.

It is possible to place a number of rows 1 with the base 2 in the cooled condition and then to heat the base 2 to obtain an intimate contact, and variations are possible by using a designed fixture.

Next, as shown in FIG. 3(C), the overall surface of the base 2 is subjected to ultraviolet light, thereby causing curing of the parts of the dry film photo-resist 7 to which a row 1 is not adhered.

Because the cured dry film photo-resist has increased strength compared to before being curing, there is an improvement in effectiveness of protecting the base during the subsequent ion milling process.

Because the curing destroys the stickiness of the exposed parts of the dry film photo-resist 7, handling is facilitated.

Next, as shown in FIG. 3(D), a laminator is again used to adhere the dry film photo-resist 8.

The dry film photo-resist 8 used here becomes the mask material for forming a cavity in the air bearing surface, and this can be the same as the dry film photo-resist 7 used in the adhering of the rows 1 to the base 2.

In fact, it is appropriate to select the dry film photo-resist for the resist mask 8 in view of the demand for accuracy, and to use this also for adhesion.

Next, exposure of the dry film photo-resist 8 is done through a reticule mask projected in the prescribed air bearing shape, followed by developing, resulting in the patterning shown in FIG. 3(E).

Then, the structure is placed in an ion milling machine and, after etching with an argon ion beam, the dry film 8 is peeled off, resulting in the cavity in row 1 shown in FIG. 3(F).

Finally, by cutting away each individual head, magnetic heads having a distinctly shaped slider are completed, as shown in FIG. 3(G).

In magnetic head sliders manufactured in this manner, there was absolutely no damage to the element surface observed.

Figure 4:
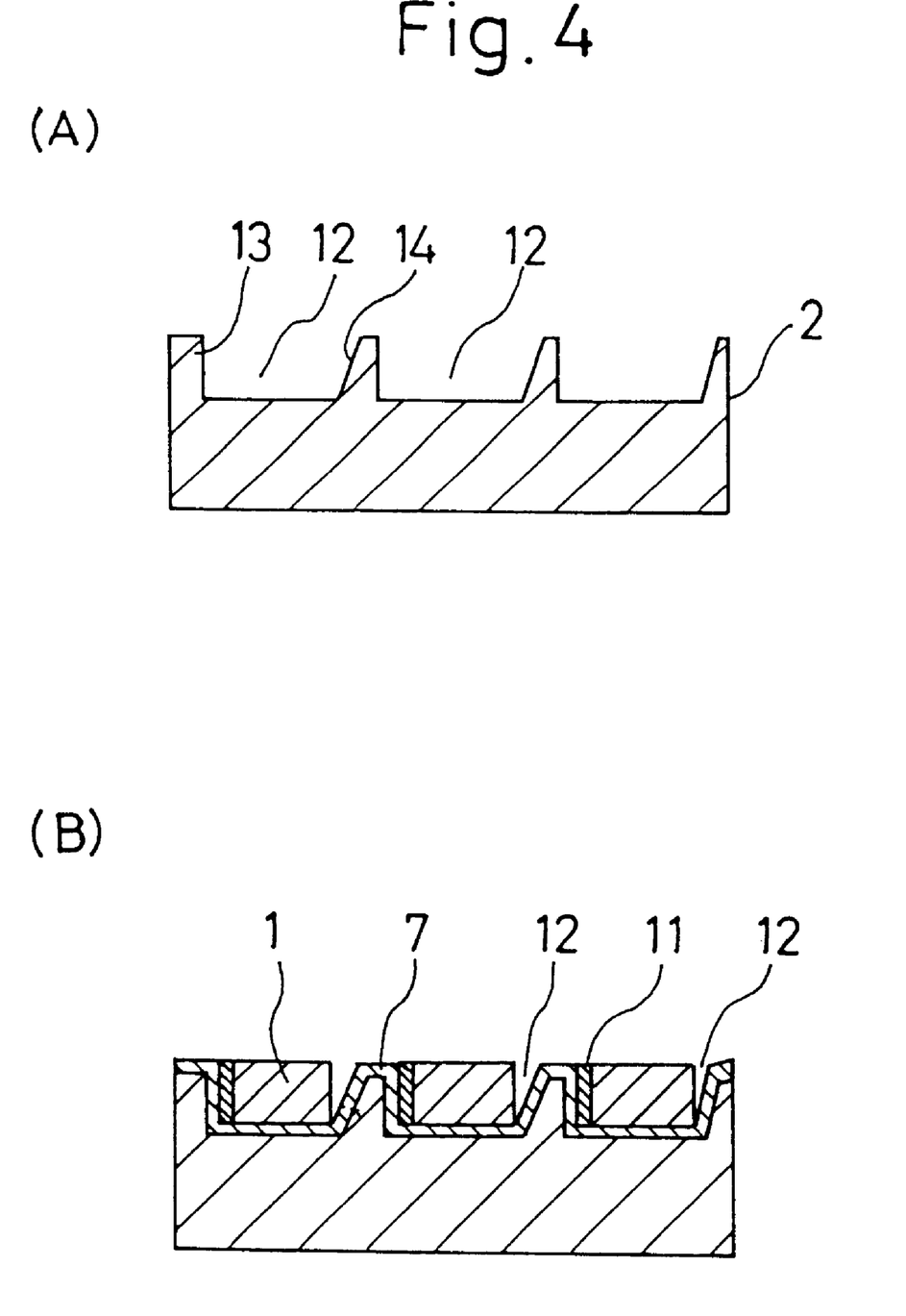
FIG. 4 is a simplified drawing which shows another example of a magnetic head slider according to the present invention.

Next, yet another magnetic head slider manufacturing method, the fourth embodiment of the present invention, will be described, this description being for the example of using a base 2 having a cross-section as shown in FIG. 4(A).

In this example, one side surface 13 of the groove 12 is cut so as to stand perpendicularly so that it protects the row 1 element surface, while the other 14 is formed as an inclined surface to facilitate alignment.

The condition after adhering the rows 1 is shown in FIG. 4(B). Upon manufacturing a magnetic head slider using this type of base and the manufacturing method indicated as the third embodiment, the same type of good results were obtained, without any difference with respect to the third embodiment.

Figure 5:
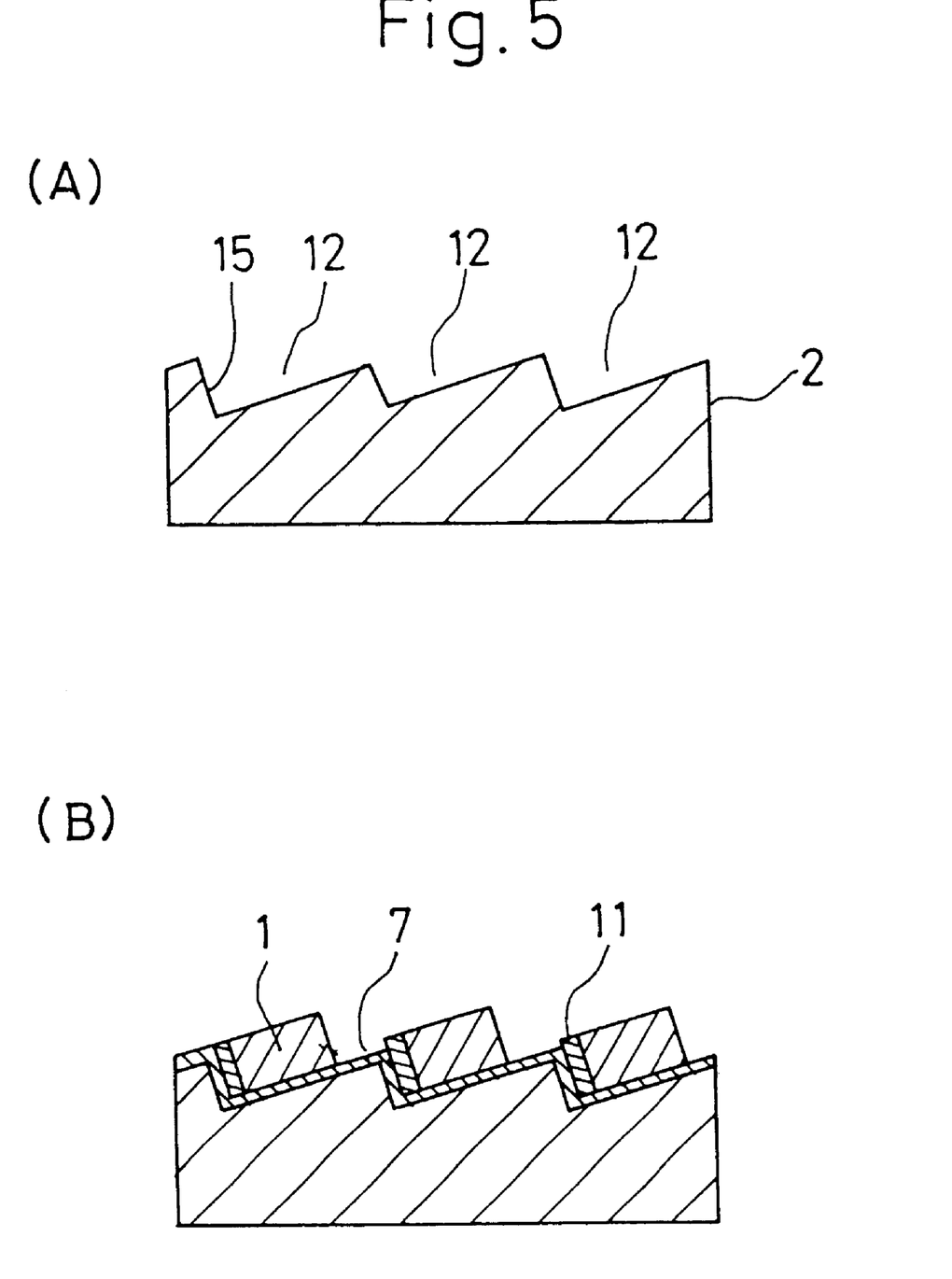
FIG. 5 is a simplified drawing which shows yet another example of a magnetic head slider according to the present invention.

Next, yet another magnetic head slider manufacturing method, the fifth embodiment of the present invention, will be described, this description being for the example of using a base having a cross-section as shown in FIG. 5(A).

In this embodiment as well, because the element surface to be protected is usually just one surface of the row, one side surface 15 of the groove 12 is cut so as to stand perpendicularly with respect to the bottom surface of the groove 12 so that it protects the row 1 element surface, while the other, which is the right side, is formed as an inclined surface to facilitate alignment.

The condition after adhering the rows 1 is shown in FIG. 5(B).

Upon manufacturing a magnetic head slider using this type of base and the manufacturing method indicated as the third embodiment, the same type of good results were obtained, without any difference with respect to the third embodiment.

However, when exposing the dry film photo-resist (corresponding to 8 in FIG. 2) which is used as a mask for formation of a cavity, it is necessary to make the air bearing surface horizontal and further to adjust the focus on each row individually. It is also possible to use only a non-contact type exposure system such as a stepper.

The constitution of the above-noted embodiment is that of a magnetic head slider manufacturing method which has a base with a groove into which the sliders being processed can be placed, the construction thereof being such that it is possible to cover at least one side surface of the air bearing surface of the magnetic slider being processed, other than the air bearing surface, by dry film photo-resist that comes around into the side wall of this groove.

Furthermore, in the technical constitution of the above-noted embodiment it is preferable that part of the side wall of the above-noted groove be formed at an angle that it not perpendicular with respect to the flat base surface, and it is also desirable that the bottom surface of the above-noted groove be formed at an angle that is not horizontal with respect to the flat surface of the base.

As described above, according to the present invention, in a dry etching process which processes the air bearing surface of a distinctly shaped slider, it is possible to perform high-speed etching with a low failure rate in comparison to the past method of adhering a row to a base.

Additionally, according to the present invention, in a dry etching process which processes the air bearing surface of a distinctly shaped slider, it is possible to perform high-speed etching with a low failure rate in comparison to the past method of adhering a row to a base, thereby obtaining a head with superior reliability at a low cost.

What is claimed is:

1. A method for manufacturing a magnetic head slider, said method comprising the steps of:

adhering dry film photo-resist to a base that is capable of holding at least one slider or material that is to become a slider, adhering to said dry film photo-resist said slider or said material that is to become a slider, and etching a part of said dry film photo-resist using a dry etching method to obtain an air bearing shape.

2. The method for manufacturing a magnetic head slider according to claim 1, wherein said base is made of metal or a ceramic and has a surface to which at least one slider or material that is to become a slider can be adhered.

3. The method for manufacturing a magnetic head slider according to claim 1, wherein the thickness of said dry film photo-resist is 100 $\mu$m or less.

4. The method for manufacturing a magnetic head slider according to claim 1, wherein the adhering of said dry film photo-resist to said base is performed by a step of peeling off a protective film from one side of said dry film photo-resist and causing that side to come into intimate contact with said base, to which it is brought into opposition.

5. The method for manufacturing a magnetic head slider according to claim 1, wherein the adhering to said dry film photo-resist of said slider or said material that is to become a slider includes a step of peeling off a protective film from a side of said dry film that is different from the side that is in opposition to the base, a step of aligning said slider or said material that is to become a slider on top of said surface and applying pressure thereto, and a step of causing bridging of the exposed dry film photo-resist using a sufficient amount of ultraviolet light.

6. The method for manufacturing a magnetic head slider according to claim 1, wherein said drying etching method is ion beam etching in which argon gas is introduced.

7. The method for manufacturing a magnetic head slider according to claim 1, wherein said drying etching method is a reactive ion etching method.

8. The method for manufacturing a magnetic head slider according to claim 1, further comprising a step of adhering at least one slider or material that is to become a slider to said dry film photo-resist while said base is maintained in a heated state.

9. The method for manufacturing a magnetic head slider according to claim 8, wherein said base is at a temperature of 80° C.

10. The method for manufacturing a magnetic head slider according to claim 1, further comprising a step of forming a prescribed mask over said slider or said material that is to become a slider, thereby preventing etching portions of said slider or said material covered by said prescribed mask.

11. The method for manufacturing a magnetic head slider according to claim 1, wherein the step of forming a prescribed mask forms a resist mask using an additional dry film photo-resist adhered over said dry film photo-resist.

12. The method for manufacturing a magnetic head slider according to claim 10, wherein the step of forming a prescribed mask forms said additional dry film photo-resist being of the same material as said dry film photo-resist.

13. A method for manufacturing a magnetic head slider, said method comprising the steps of:

adhering dry film photo-resist to a base that is capable of holding at least one slider or material that is to become a slider, wherein said base has a groove into which a slider under processing can be held, adhering to said dry film photo-resist said slider or said material that is to become a slider, and etching a part of said dry film photo-resist using a dry etching method to obtain an air bearing shape.

14. The method for manufacturing a magnetic head slider according to claim 13, wherein said groove is constructed to cover at least one side surface of said air bearing shape, other than an air bearing surface of said magnetic slider being processed, by dry film photo-resist that comes around into said side wall of said groove.

15. The method for manufacturing a magnetic head slider according to claim 13, wherein a part of said side wall of said groove is formed so as to be at an angle other than perpendicular to a flat surface of said base.

16. The method for manufacturing a magnetic head slider according to claim 13, wherein a bottom surface of said groove is formed so as to be at an angle that is not horizontal with respect to a flat surface of said base.

* * * * *